United States Patent [19]
Harvey

[11] 3,736,057
[45] May 29, 1973

[54] ZONE RANGE FINDER APPARATUS

[75] Inventor: Donald M. Harvey, Webster, N.Y.

[73] Assignee: Eastman Kodak Company, Rochester, N.Y.

[22] Filed: Apr. 12, 1971

[21] Appl. No.: 133,058

[52] U.S. Cl. ..........................356/4, 356/1, 250/201, 95/44 C
[51] Int. Cl. ...............................................G01c 3/08
[58] Field of Search........................356/1, 4; 95/44 C; 250/204, 201

[56] References Cited

UNITED STATES PATENTS

| | | | |
|---|---|---|---|
| 3,054,898 | 9/1962 | Westover et al............................ | 356/4 |
| 3,198,952 | 8/1965 | Benham et al............................. | 356/1 |

*Primary Examiner*—Benjamin A. Borchelt
*Assistant Examiner*—S. C. Buczinski
*Attorney*—W. H. J. Kline

[57] ABSTRACT

A zone type range finder apparatus is disclosed which in-cludes means for projecting a beam of light toward an object, two spaced photosensitive devices having electrical parameters which respectively vary as a function of the brightness of light incident thereon reflected from the object, and circuitry coupled to the devices for producing a signal having a positive polarity when the object to be photographed is in a first range of distances measured with respect to a reference plane and a negative polarity when the object to be photographed is in a second range of distances measured with respect to the reference plane. The apparatus further includes means responsive to the signal when it reaches a predetermined magni-tude in the positive polarity for indicating that the object is in the first range of distances and responsive to the signal when it declines to a predetermined magnitude in the negative polarity for indicating that the object is in the second range of distances.

7 Claims, 4 Drawing Figures

DONALD M. HARVEY
INVENTOR.

BY Raymond L. Owens
W. H. J. Kline
ATTORNEYS

PATENTED MAY 29 1973 3,736,057

DONALD M HARVEY
INVENTOR.

BY Raymond L. Owens
W.W.J. Kline
ATTORNEYS

ZONE RANGE FINDER APPARATUS

CROSS REFERENCES TO RELATED APPLICATIONS

Reference is made to commonly assigned copending U.S. Pat. application, Ser. No. 114,279, entitled "Dual Photocell Range Finder Apparatus," filed Feb. 10, 1971 in the name of Donald M. Harvey, the disclosure of which is incorporated in its entirety herein.

BACKGROUND OF THE INVENTION

The present invention relates to zone type range finder apparatus having photosensitive devices that receive light reflected from an object and produce signals indicative of the distance of an object relative to a reference position.

Range finder apparatus for photographic applications are known which employ a pair of spaced photosensitive devices having parameters which respectively vary as a function of the brightness of incident light reflected from an object whose distance relative to a film plane is to be determined. Typically, the photosensitive devices are differentially connected in an electrical circuit that produces a signal which varies as a function of variations in the parameter of the devices. In U. S. Pat. No. 3,443,502 entitled "Automatic Focusing for Cameras" and assigned to the same assignee as the present invention, a zone type range finder apparatus is disclosed which employs two photosensitive devices.

While the type of range finder apparatus just referred to performs satisfactorily under most conditions, there is a problem when a primary object is relatively narrow and there is a secondary object in the scene which may actually reflect light that also illuminates the photosensitive devices. In such a situation, the photosensitive devices may produce an output signal which causes the apparatus to improperly indicate which zone the primary object is in.

BRIEF DESCRIPTION OF THE INVENTION

In the disclosed embodiment of the invention an automatic zone-type range finder apparatus is disclosed which includes first and second photosensitive devices disposed in a predetermined space relation with respect to each other and each being adapted to receive reflected light from an object. Each device has an electrical parameter which varies as a function of the brightness of incident light. A circuit coupled to the devices produces a signal having a positive polarity when the first photosensitive device receives more incident illumination than the second device to indicate that the object is in a first range of distance relative to a reference plane, and a second polarity when the second photosensitive device receives more incident illumination than the first device to indicate that the object is disposed within a second range of distance relative to the reference plane. The apparatus further includes means responsive to the signal when it has a predetermined magnitude of positive polarity for indicating that the object is disposed within the first range of distance and responsive to the signal when it has a predetermined magnitude of negative polarity for indicating that the object is disposed within the second range of distances.

BRIEF DESCRIPTION OF THE DRAWINGS

The above and other objects and advantages of the present invention will become apparent to one skilled in the art from the following detailed description taken in conjunction with the attached drawings wherein.

DESCRIPTION OF THE PREFERRED EMBODIMENTS

A preferred embodiment of the invention is disclosed in conjunction with an automatic focusing apparatus for a still camera. However, it will be understood that range finder apparatus in accordance with the invention may be used in other types of cameras and in other applications. Because cameras, and more particularly automatic focusing apparatus for cameras, are generally well known in the art, the present disclosure will be directed in particular to elements forming part of, or cooperating more directly with apparatus in accordance with the present invention, and it will be understood that apparatus not specifically shown or described may take various forms known in the art.

Figure 1:
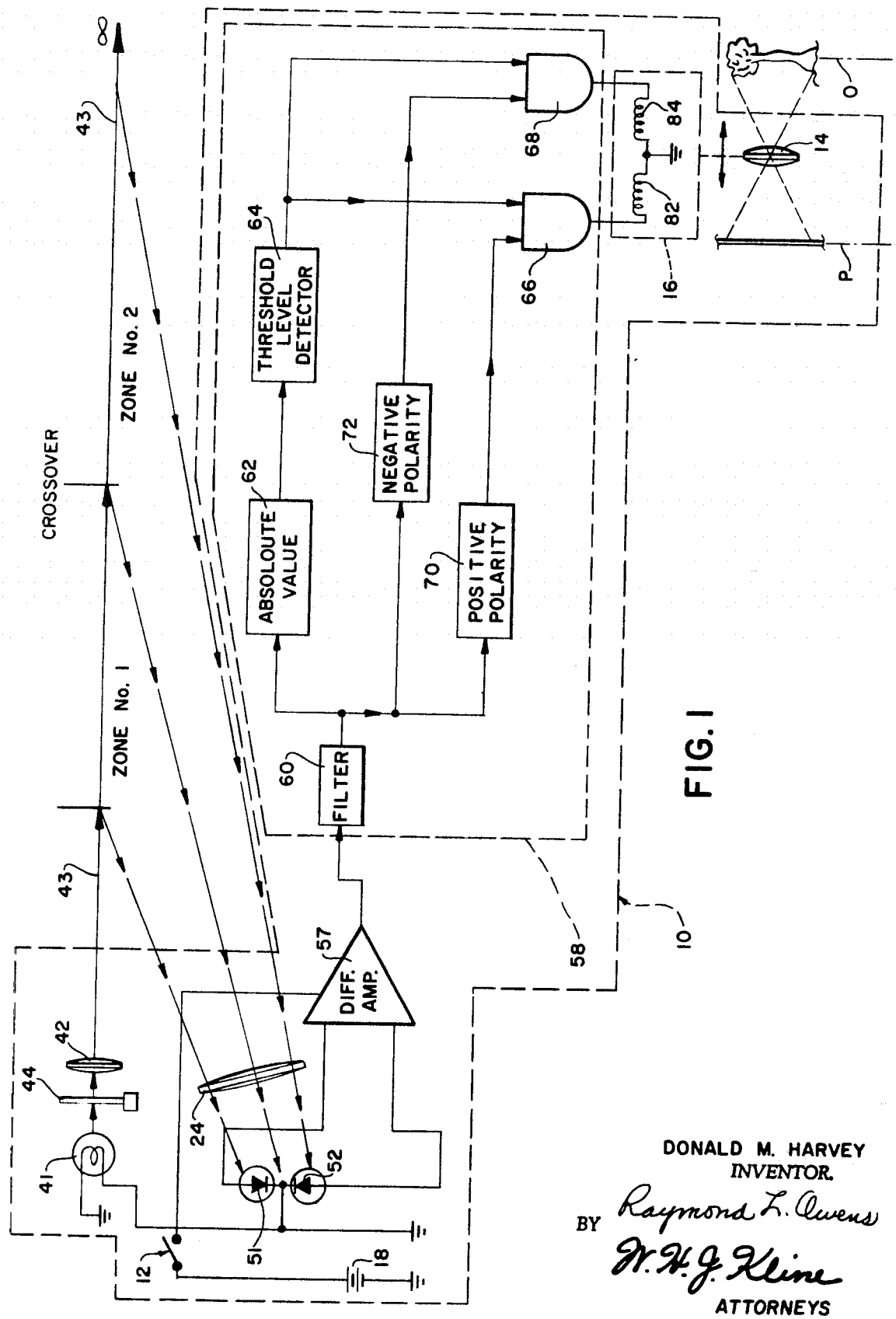
FIG. 1 is a schematic diagram partially in block form of an automatic zone type range finder apparatus in accordance with the present invention and which may be embodied in a still camera.

In FIG. 1 there is shown a camera system including an objective lens 14, which is movable in response to operation of a focusing means 10 (see FIG. 4) to a position wherein it is adapted to focus an image of an object 0 to be photographed in a primary image plane P. The focusing means 10 includes a switch 12 adapted to be closed by the user of the camera to couple a battery 18 and energize a source of light 41. Light from the source is projected by a lens 42 toward the scene to be photographed and is modulated at predetermined frequency by appropriate means such as a chopper 44, which may take various forms well known to those skilled in the art, such as for example electronic means.

The beam of light projected by the lens 42 along a line-of-sight path 43 illuminates a field which includes both a first range of distances (Zone No. 1) relative to the film plane P within the camera and a second range of distances relative to the film plane P (Zone No. 2). Zone No. 2 is the range of distances between the boundary of Zone No. 1 and infinity. When the object scene is disposed in the center of the camera viewfinder, light projected by the lens 42 is reflected from the object and an image of the object is formed by a lens 24, disposed in a predetermined spaced relation with respect to the light source 41, on two photosensitive devices 51 and 52.

In the specific illustrated embodiment, the photosensitive devices 51 and 52 are photodiodes which are positioned within the camera in back of the receiving lens 24. The photodiodes 51 and 52 are spaced a small distance apart, for example, in the order of two mils and each have a parameter, namely, resistance which varies as a function of the brightness of light incident thereon. The photodiodes 51 and 52 are each electrically connected to a differential amplifier 57 which is also coupled to the battery 18. The differential amplifier 57 produces an output signal in magnitude corresponding to the difference between the voltage drops across the photodiodes 51 and 52, each of which is a function of the magnitude of the resistance and thus the intensity of illumination in the respective photodiodes 51 and 52. Since the differential amplifier 57 only responds to voltage differences, voltage drops across both resistance 51 and 52 caused by ambient illumination or noise will be substantially eliminated.

The output signal from the amplifier 57, at the predetermined frequency of the chopper 44, is applied as an input to logic circuitry 58. The circuitry 58 includes a filter network 60 which has a narrow pass band which permits the predetermined frequency to pass but rejects spurious signal components such as those produced by external light sources which illuminates the photodiodes 51 and 52.

The differential amplifier 57 is at a reference level such as zero level when an object is disposed at the common boundaries or crossover location between Zones 1 and 2. More specifically, when an object is disposed at the crossover location, the brightness of reflected illumination incident on each of the photodiodes 51 and 52 is substantially equal and the filtered voltage signal will be at a zero level. If the object is disposed in Zone 1, the photodiode 51 will receive more incident illumination and the filtered signal will swing relatively positive. On the other hand, if the object is disposed in the far Zone 2, the photodiode 52 will receive more incident illumination and the filtered signal will swing relatively negative.

To facilitate an understudy of the invention the photodiodes and amplifier have been described as producing a zero reference signal when the object is disposed at the crossover position. However this reference level can have other values which may be arbitrarily selected, such as + or − 5 volts. Accordingly, whenever the term polarity is used in this disclosure, it should be taken in a relative sense. Thus, the term positive polarity means a potential more positive than the reference level (viz. the potential when the object is at the crossover level). Similarly, the term negative polarity means a potential which is negative or less positive than the reference level.

The logic circuitry 58 is adapted to control a zone indicating apparatus 16 which includes two impedance elements 82 and 84. In FIG. 1, the elements 82 and 84 are coils which may be wound in a motor which is adapted to move the lens 14 along a path shown by the arrows. Thus, as viewed in FIG. 1, if the coil 82 is energized, the motor moves the lens 14 to the left and if the coil 84 is energized the motor will move the lens 14 to the right. In FIG. 4, the elements 82 and 84 are also coils, whereas in FIG. 3, the elements 82 and 84 are filaments of lamps.

Returning to FIG. 1, when a low level voltage is applied to the circuitry 58 indicating that the object is in proximity to the crossover or boundary line between Zones 1 and 2, neither of the elements 82 and 84 will be energized. In the disclosed embodiment the logic circuitry 58 energizes element 82 in response to the existence of two conditions. The first condition is that the filtered output signal of differential amplifier be at a positive polarity and the second condition is that the magnitude of the signal be greater than or equal to a predetermined voltage shown as level $x$ in FIG. 2. Similarly, the logic circuitry 58 energizes the element 84 in response to the existance of two conditions, namely, the output of the differential amplifier 57 be at a negative polarity, and the magnitude of the filtered signal be less than or equal to another predetermined voltage shown by the line $x^1$ in FIG. 2.

Figure 2:
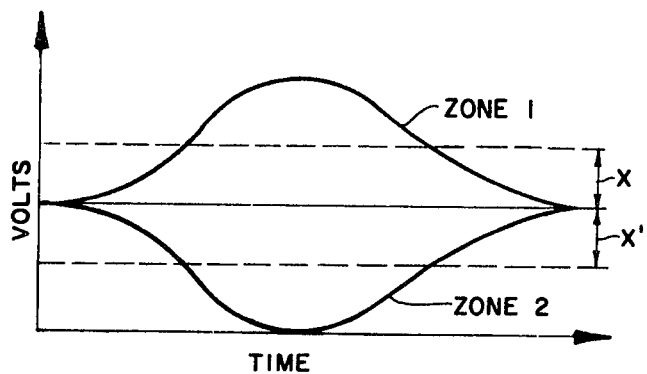
FIG. 2 is a curve showing a filtered signal produced by the differential amplifier embodied in the range finder apparatus of FIG. 1.

To accomplish the result described above, the logic circuitry 58 includes a circuit 62 which produces a signal corresponding to the absolute value of the magnitude of the filtered differential amplifier signal. The output of circuit 62 is applied to a threshold level detector 64 which establishes an input signal to AND gates 66 and 68 when the signal input to detector 64 reaches a predetermined threshold magnitude or level which in the instant case will be whenever the signal is greater than $x$ volts or less than $x^1$ volts as shown in FIG. 2. In this embodiment the absolute value of the voltage levels $x$ and $x^1$ are equal. The AND gate 66 will provide a conductive path to energize impedance element 82 whenever the threshold level detector 64 produces an output and a positive polarity detector 70 provides an output. Similarly impedance element 84 will be energized when a negative polarity detector 72 produces an output and the threshold level detector 64 provides an output.

By means of the foregoing arrangement, the indicating apparatus 16 will properly indicate which zone the primary object is in. However, if the primary object is near the crossover location then neither element 82 or 84 will be energized. Typically, should a secondary object reflect light toward the photodiodes 51 and 52, the signal produced at the output of the amplifier 57 will not be of a sufficient magnitude to cause the threshold level detector 64 to establish an output. Hence, neither of the elements 82 or 84 will be energized.

Figure 3:
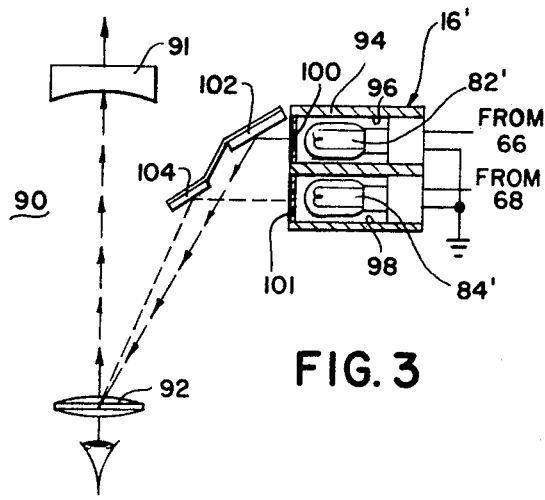
FIGS. 3 – 4 show various embodiments of indicating apparatus for indicating which range of distances the object is disposed in in response to the signal produced by the differential amplifier shown in the FIG. 1 apparatus.
Figure 4:
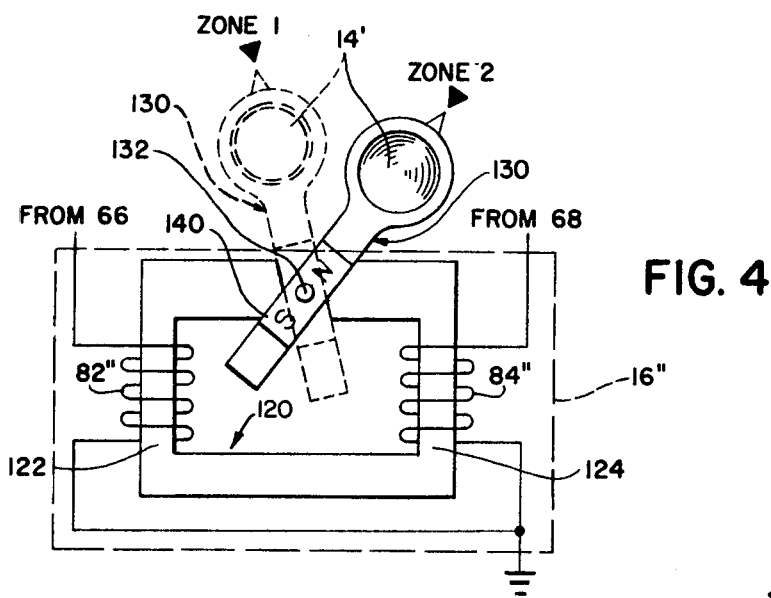

In FIG. 3, the zone indicating apparatus 16' operates in conjunction with a viewfinder 90 having lenses 91 and 92. The construction of the viewfinder 90 has only been shown in schematic form since viewfinders are well understood to those skilled in the art. The indicating apparatus 16' comprises a housing 94 which forms two open ended cylindrical chambers, 96 and 98. The chamber 96 receives a lamp 82' and a transparency 100 with a positive image which indicates to the user that the primary object is in zone 1. The chamber 98 receives a lamp 84' and a transparency 101 with a positive image which indicates that the object is in zone 2. A mirror 102 is disposed to receive the positive image from the transparency 100 when the lamp 82' is energized and project the image into the field of the lens 92 of the viewfinder 90 to indicate to a user that the object is in zone 1.

Similarly, a mirror 104 receives the positive image from the transparency 101 when the lamp 84' is energized and projects it into the field of the lens 92 for viewing by the user. If neither lamp is illuminated, then the operator knows the object is in the region of the crossover location. The user then will make the appropriate adjustment of the camera objective lens 14 to focus an image of the object in the film plane P. Alternatively, optical light pipes could be used to transmit images to the mirrors 102 and 104. Still further, an opaque mask could be disposed to be movable between positions to selectively cover a selected one of the lamps to indicate which zone the object is disposed in.

In FIG. 4, the apparatus 16'' includes a permanent magnet 120 having a first core portion 122 about which is wound the impedance element 82'' and a second core portion 124 about which is wound the second impedance element 84''. The apparatus further includes a member 130 which is rotatably mounted on a pin 132 fixed to the member 120. The member 130 is provided with a permanent magnet 140 intermediate its remote ends and carries at one remote end the objective lens 14. If the coil 82'' is energized a force will be exerted on the member 130 causing it to be swung to the near position so that the objective lens 14 will be disposed in the optical path of the camera as shown in dotted line. However, if the coil 84'' is energized, the member 130 will be swung to the far position and the lens 14 positioned out of the optical path of the camera. The camera will be understood to include a fixed lens system. Only one coil need be provided and a spring could maintain the member 130 in one position until the coil is energized, at which time a force would be exerted to overcome the urging of the spring and position the member 130 in the other position. A similar arrangement could also be provided wherein the camera objective lens 14 is on a helical mount and is movable along the optical path of the camera to different positions depending upon which coil is energized.

The invention has been described in detail with particular reference to preferred embodiments thereof, but it will be understood that variations and modifications can be effected within the spirit and scope of the invention.

I claim:

1. In zone type range finder apparatus for determining whether an object is disposed within a first range of distances relative to a reference plane or a second range of distances relative to the reference plane and including means for projecting a beam of light towards an object and first and second photosensitive devices, with each device having a parameter the magnitude of which varies as a function of the brightness of incident illumination reflected from the object, the combination comprising:
   a. means coupled to said first and second photosensitive devices for producing a signal the magnitude and polarity of which varies in accordance with changes in the magnitude of the parameters of the first and second photosensitive devices, said signal having a first polarity when said object is disposed in said first range of distances and a second polarity when said object is disposed in said second range of distances; and
   b. means responsive to said signal having said first polarity and having a magnitude greater than a predetermined level in said first polarity for indicating that said object is in said first range of distances and responsive to said signal having said second polarity and having a magnitude less than a predetermined level in said second polarity for indicating said object is in said second range of distances.

2. The invention as set forth in claim 1 wherein said signal producing means comprises a differential amplifier and said signal responsive means comprises logic circuitry.

3. The invention as set forth in claim 1 wherein said range finding apparatus is an automatic focusing apparatus having means an objective lens and for moving said objective lens to a first position for focusing an image of the object in the reference plane when the object is in said first range of distances and for moving said objective lens to a second position when the object is in said second range of distances.

4. The invention as set forth in claim 1 wherein said signal responsive means comprises a lamp and means for projecting an image when said lamp is energized to indicate that the object is disposed in said particular range of distances.

5. In zone type rangefinder apparatus for determining whether an object is disposed within a first range of distances relative to a reference plane or a second range of distances relative to the reference plane and including means for projecting a pulsated beam of light at a predetermined frequency towards an object and first and second photosensitive devices each having a parameter the magnitude of which varies as a function of the brightness of incident illumination reflected from the object, the combination comprising:
   a. means coupled to the first and second photosensitive devices and including signal filtering means for passing a filtered signal at said predetermined frequency having a magnitude and polarity which varies in accordance with changes in the magnitude of the parameters of the first and second photosensitive devices, said filtered signal having a first positive polarity taken with respect to a reference level when the object is disposed in the first range of distances and a second negative polarity taken with respect to the reference level when the object is disposed in the second range of distances;
   b. logic means responsive to said signal for producing a first logic signal when said filtered signal is in said first polarity at a magnitude greater than a predetermined positive level taken with respect to the reference level and a second logic signal when said filtered signal is in said second polarity at a magnitude less than at predetermined negative level taken with respect to the reference level; and
   c. indicating means including first means responsive to said first logic signal for indicating that the object is disposed in the first range of distances and second means responsive to said second logic signal for indicating that the object is disposed in the second range of distances.

6. The invention as set forth in claim 5 wherein said indicating means comprises automatic focusing means having an objective lens and including means for positioning the object lens to focus an image of the object in the reference plane in response to said first and second logic signals.

7. The invention as set forth in claim 5 wherein said first means comprises a first lamp and means responsive to said first logic signal for energizing said first lamp and wherein said second means comprises a second lamp and means responsive to said second logic signal for energizing said second lamp.

* * * * *

PO-1050
(5/69)

UNITED STATES PATENT OFFICE
CERTIFICATE OF CORRECTION

Patent No. 3,736,057  Dated May 29, 1973

Inventor(s) Donald M. Harvey

It is certified that error appears in the above-identified patent and that said Letters Patent are hereby corrected as shown below:

IN THE ABSTRACT (line 2) — Delete "in-cludes" and substitute therefor --includes--

IN THE ABSTRACT (Line 15) — Delete "magni-tude" and substitute therefor --magnitude--

Column 6, line 2 — After "having", delete "means"

Column 6, line 2 — After "and" insert --means--

Signed and sealed this 16th day of July 1974.

(SEAL)
Attest:

McCOY M. GIBSON, JR.
Attesting Officer

C. MARSHALL DANN
Commissioner of Patents